United States Patent [19]

Madey et al.

[11] Patent Number: 5,048,954

[45] Date of Patent: Sep. 17, 1991

[54] LASER-BASED WHEEL ALIGNMENT SYSTEM

[75] Inventors: John M. J. Madey, Durham, N.C.; Julius M. J. Madey, Hillsdale, N.Y.

[73] Assignee: Miradco, N.J.

[21] Appl. No.: 377,437

[22] Filed: Jul. 7, 1989

[51] Int. Cl.⁵ .......................................... G01B 11/275
[52] U.S. Cl. ........................................ 356/155; 33/288
[58] Field of Search .................... 356/254, 255; 33/288

[56] References Cited

U.S. PATENT DOCUMENTS

| | | | |
|---|---|---|---|
| 2,700,319 | 1/1955 | Carr | 356/155 |
| 3,288,020 | 11/1966 | Lill | 33/288 |
| 3,501,240 | 3/1970 | Haynes | 33/288 |
| 3,733,132 | 5/1973 | Leighton | 356/154 |
| 3,876,310 | 4/1975 | Berndt . | |
| 3,951,551 | 4/1976 | Macpherson | 356/155 |
| 3,953,134 | 4/1976 | Appel et al. | 356/155 |
| 4,115,007 | 9/1978 | Thiele et al. | 356/155 |
| 4,135,823 | 1/1979 | Horvallius | 356/148 |
| 4,142,299 | 3/1979 | Alsina | 33/288 |
| 4,150,897 | 4/1979 | Roberts, Jr.; et al. | 356/152 |
| 4,154,531 | 5/1979 | Roberts, Jr. et al. | 356/152 |
| 4,249,824 | 2/1981 | Wiederrich et al. . | |
| 4,303,338 | 12/1981 | Morrison et al. | 356/155 |
| 4,311,386 | 1/1982 | Coesier | 356/155 |
| 4,330,945 | 5/1982 | Eck | 33/288 |
| 4,349,965 | 9/1982 | Alsina . | |
| 4,440,495 | 4/1984 | Bergstrom et al. | 356/155 |
| 4,466,196 | 8/1984 | Woodruff | 33/288 |
| 4,481,716 | 11/1984 | Beissbarth | 33/203.18 |
| 4,578,870 | 4/1986 | Cooke | 33/288 |
| 4,615,618 | 10/1986 | Bailey et al. | 356/152 |
| 4,726,122 | 2/1988 | Anderson | 33/288 |
| 4,745,469 | 5/1988 | Waldecker et al. | 358/93 |
| 4,803,785 | 2/1989 | Reilly | 33/288 |
| 4,811,250 | 3/1989 | Steber et al. | 364/551 |

FOREIGN PATENT DOCUMENTS

| | | | |
|---|---|---|---|
| 349886 | 9/1972 | U.S.S.R. | 356/155 |
| 1352195 | 11/1987 | U.S.S.R. | 356/155 |

Primary Examiner—Richard A. Rosenberger
Attorney, Agent, or Firm—Townsend and Townsend

[57] ABSTRACT

A device and method to align the wheels of motor vehicles. A beam of collimated light from a low power visible laser is split into two generally parallel beams by a partially transmitting mirror and a series of plane front surface mirrors positioned in front and along side the vehicle being serviced. The two beams are reflected from a set of plane mirrors attached to the rims of the wheels to be aligned. The vertical and horizontal angles of each of the wheel-mounted mirrors are set by calibrated lead-screws to cancel the angular displacement of the wheels expected when the wheels are properly aligned. The reflected beams are imaged through a large aperture beam combiner on a common viewing screen. Correct toe-in and camber settings are indicated when the laser beams reflected from the wheel-mounted mirrors overlap at the center of the viewing screen. The caster settings of the front wheels are measured by observing the angle at which the reflected spots travel across the screen when the steering wheel is turned the system can be used to align the front wheels only, or alternatively all four wheels simultaneously.

11 Claims, 9 Drawing Sheets

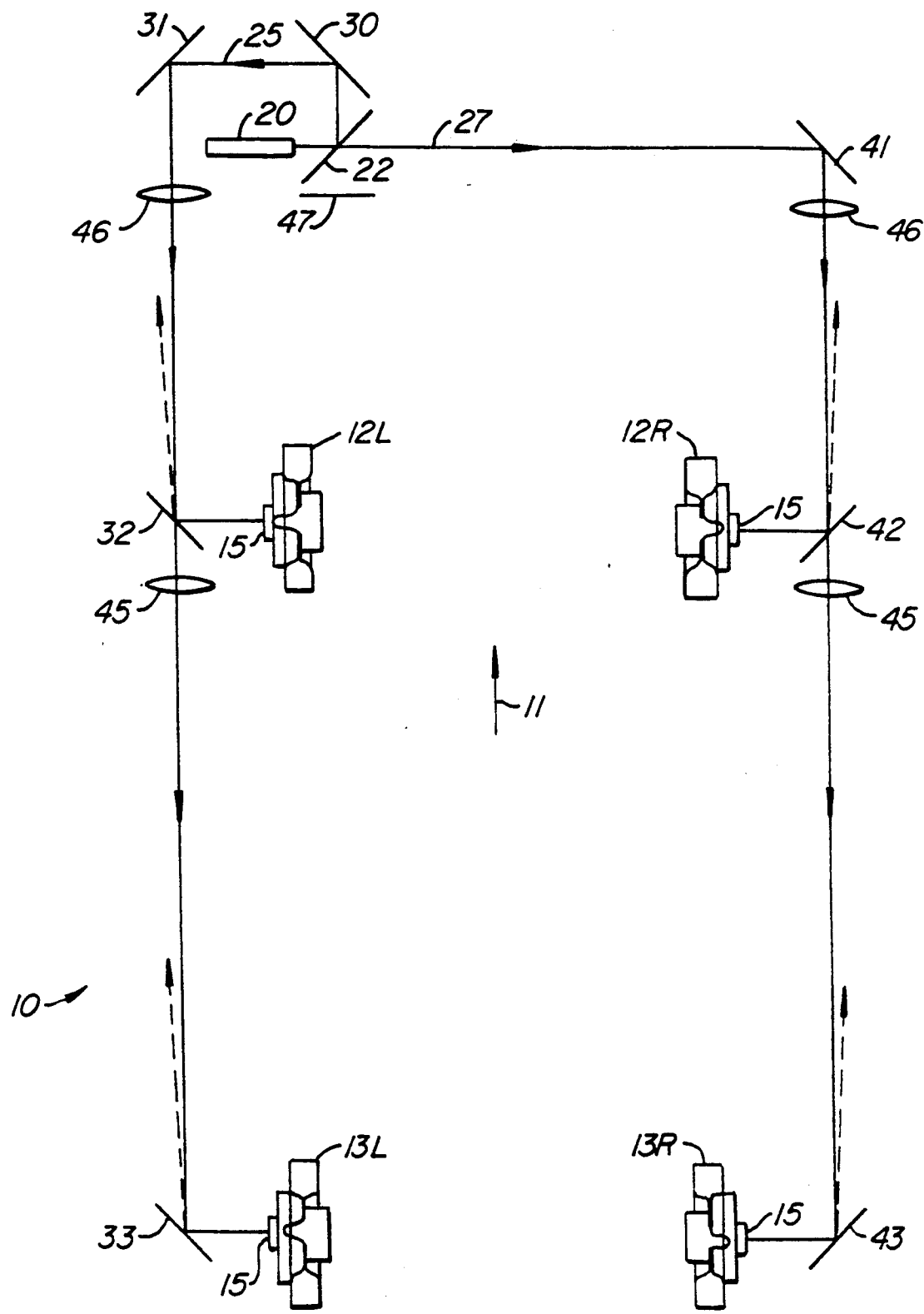
FIG._1.

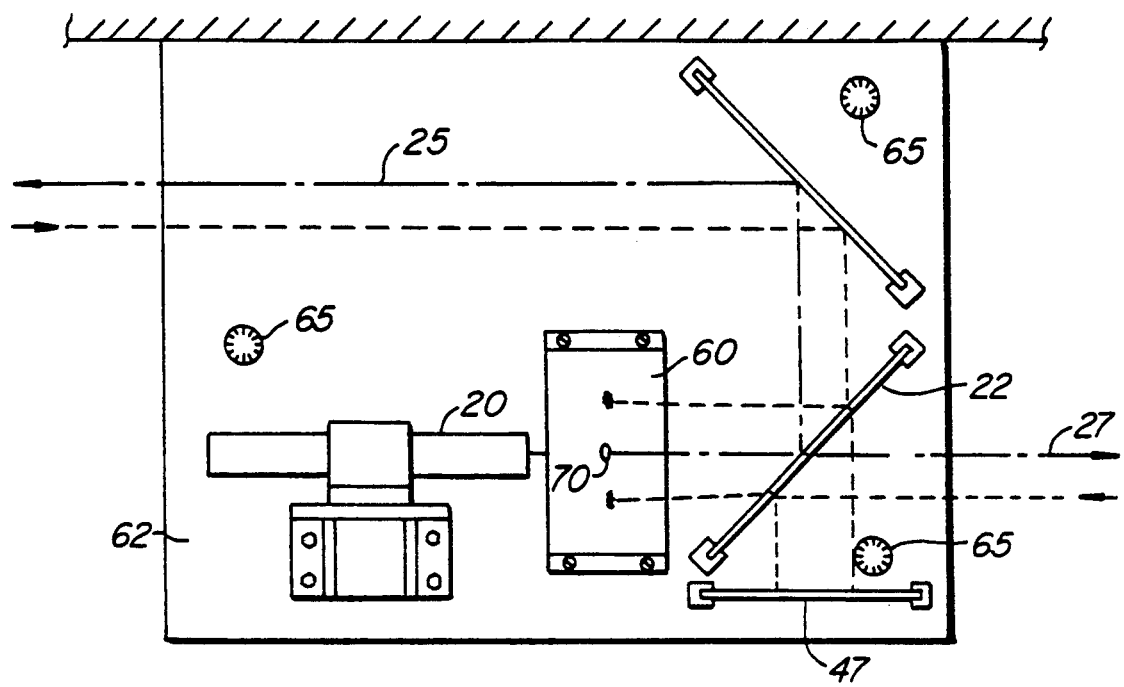
FIG._2A.
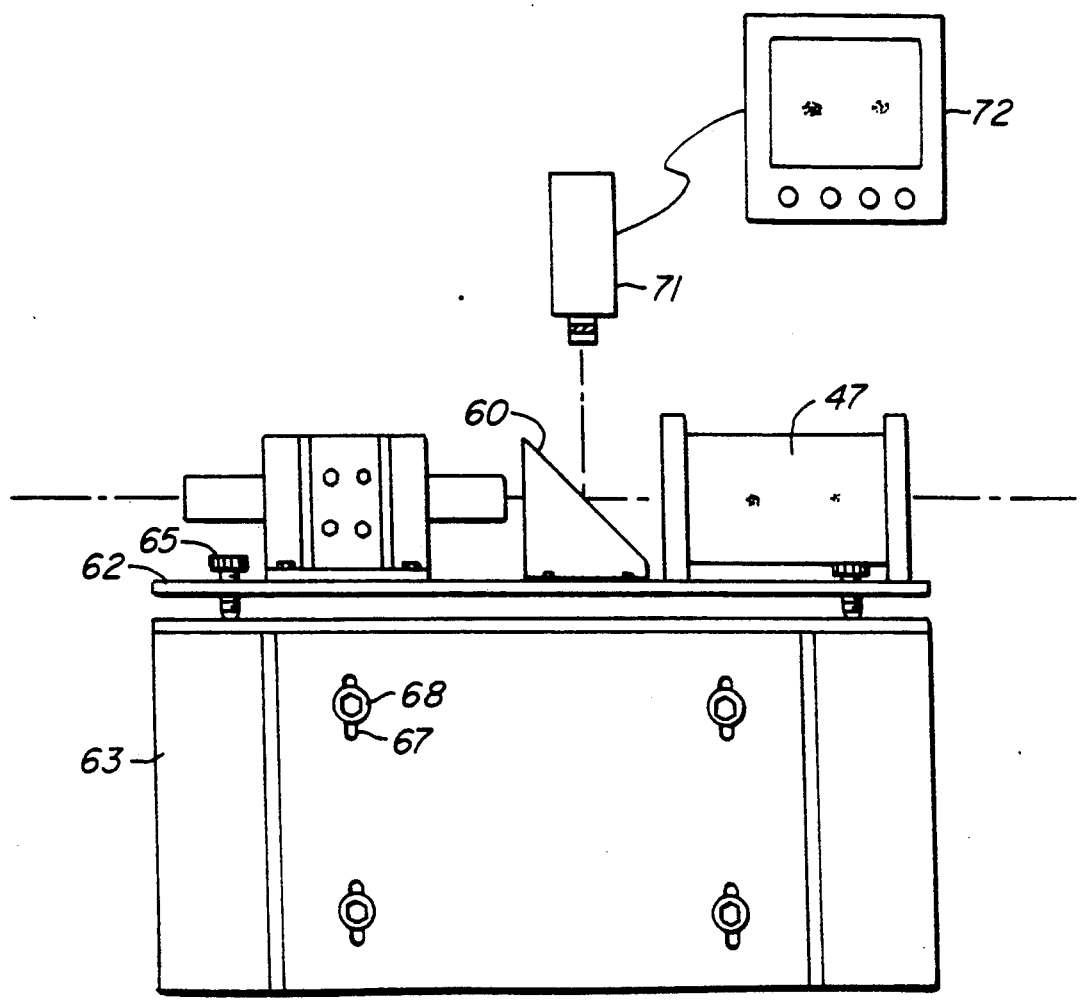
FIG._2B.

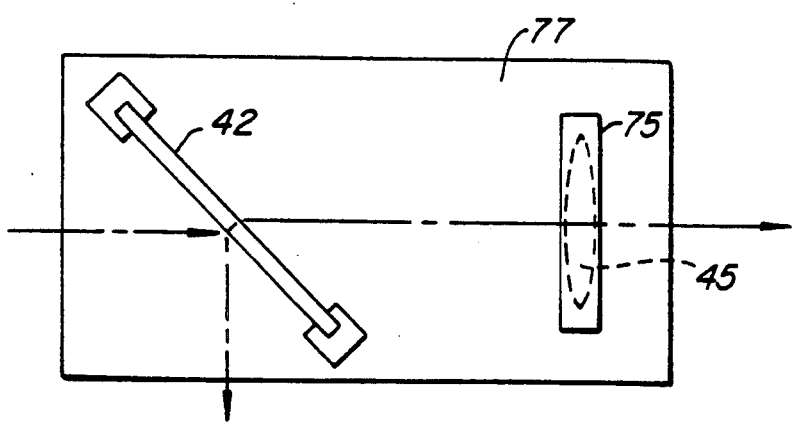
FIG._3A.
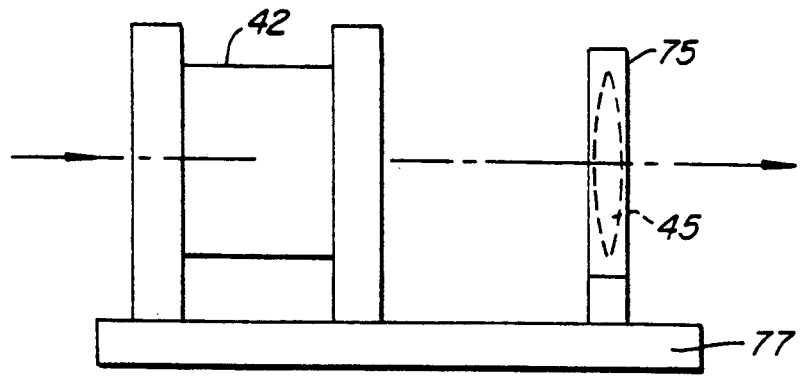
FIG._3B.
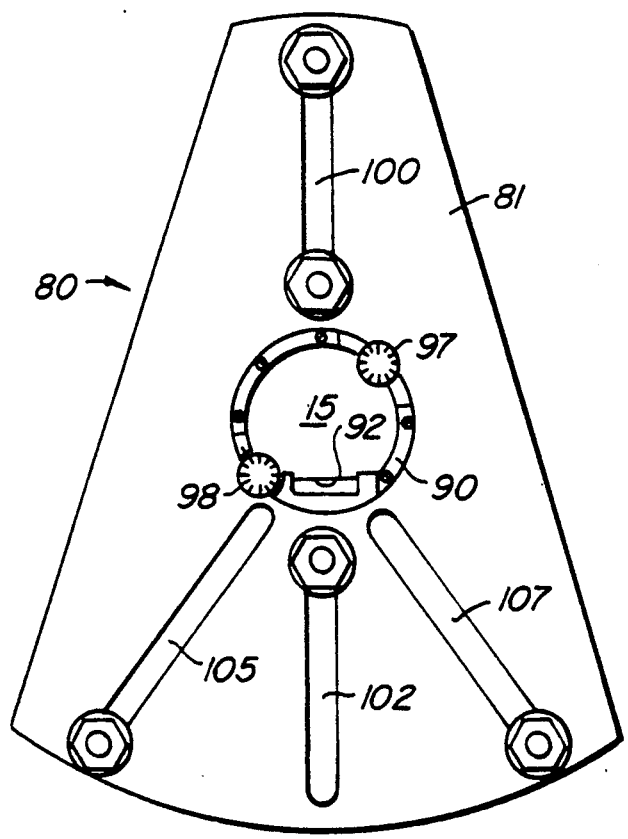
FIG._4A.
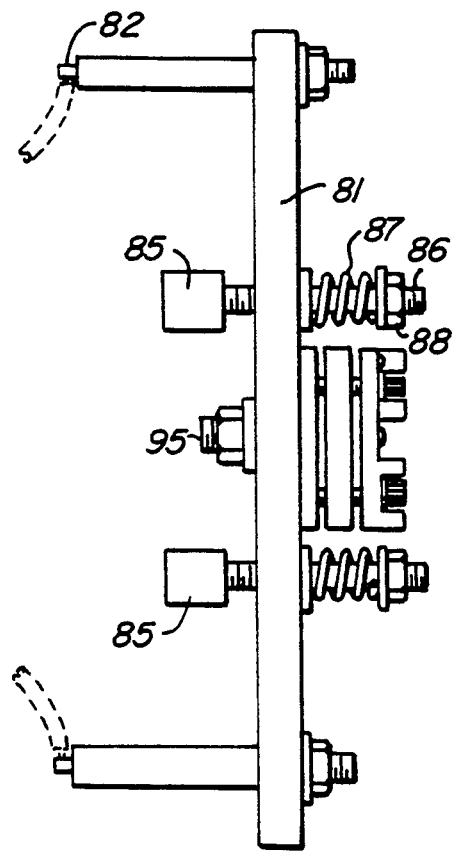
FIG._4B.

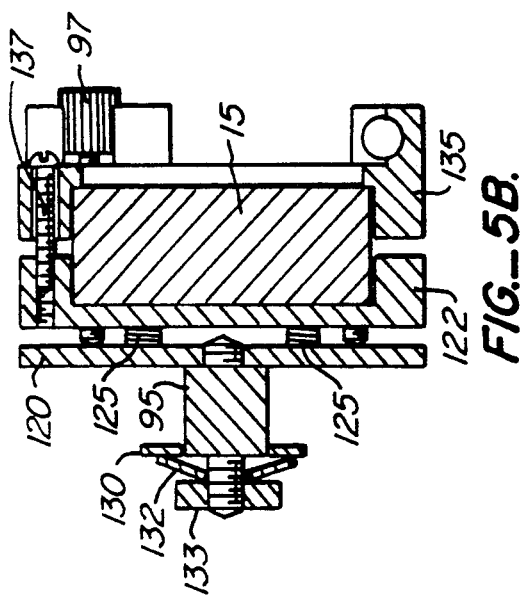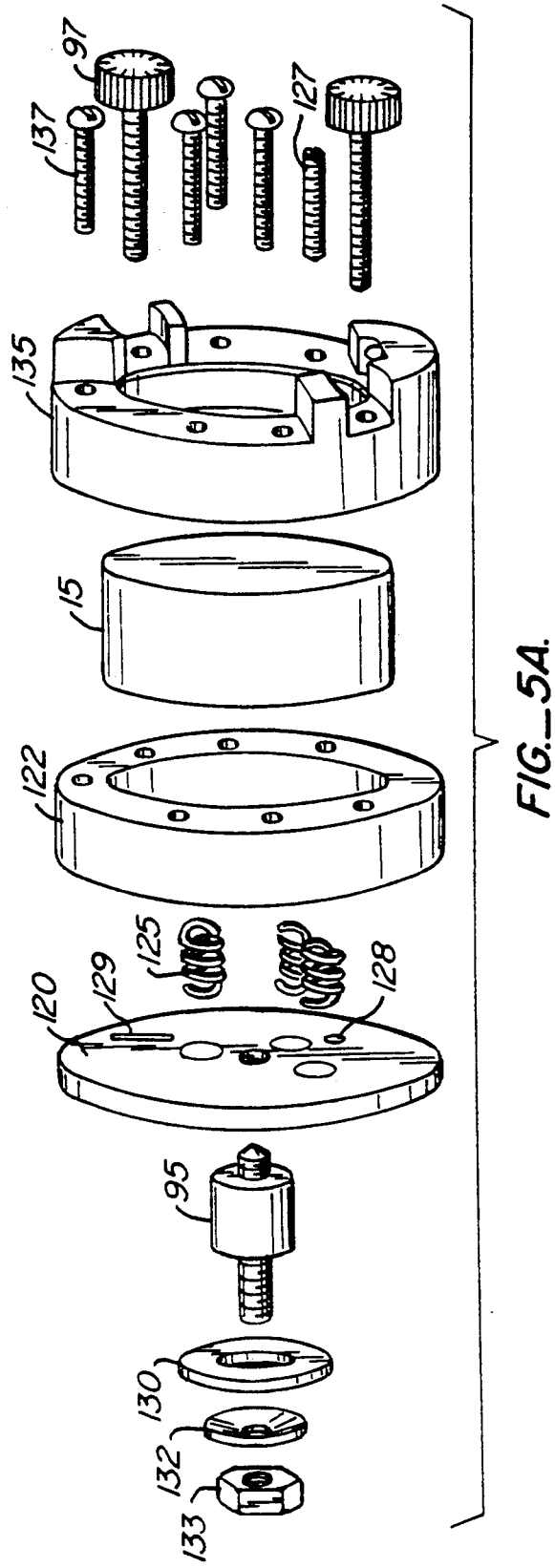

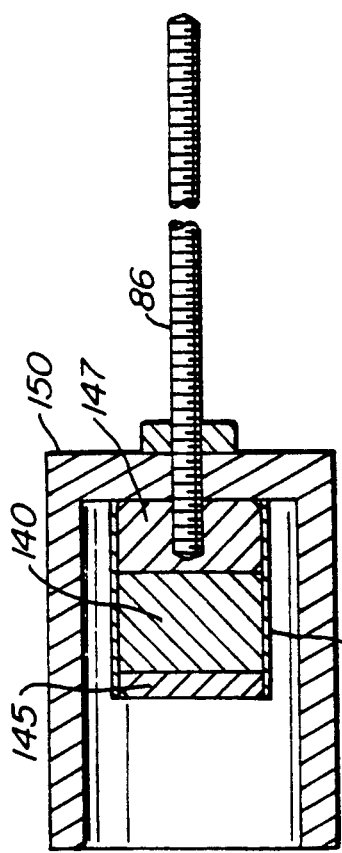
FIG._6B.
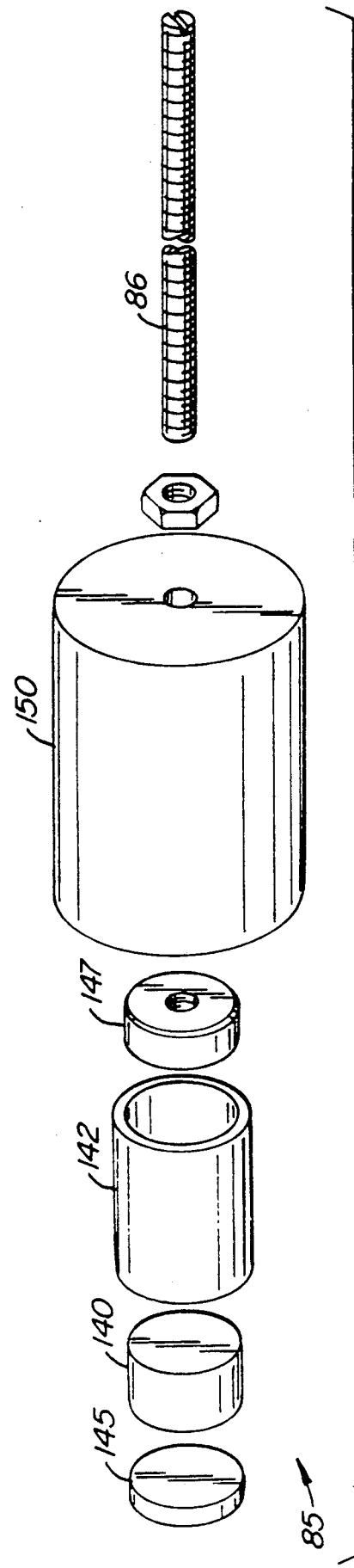
FIG._6A.

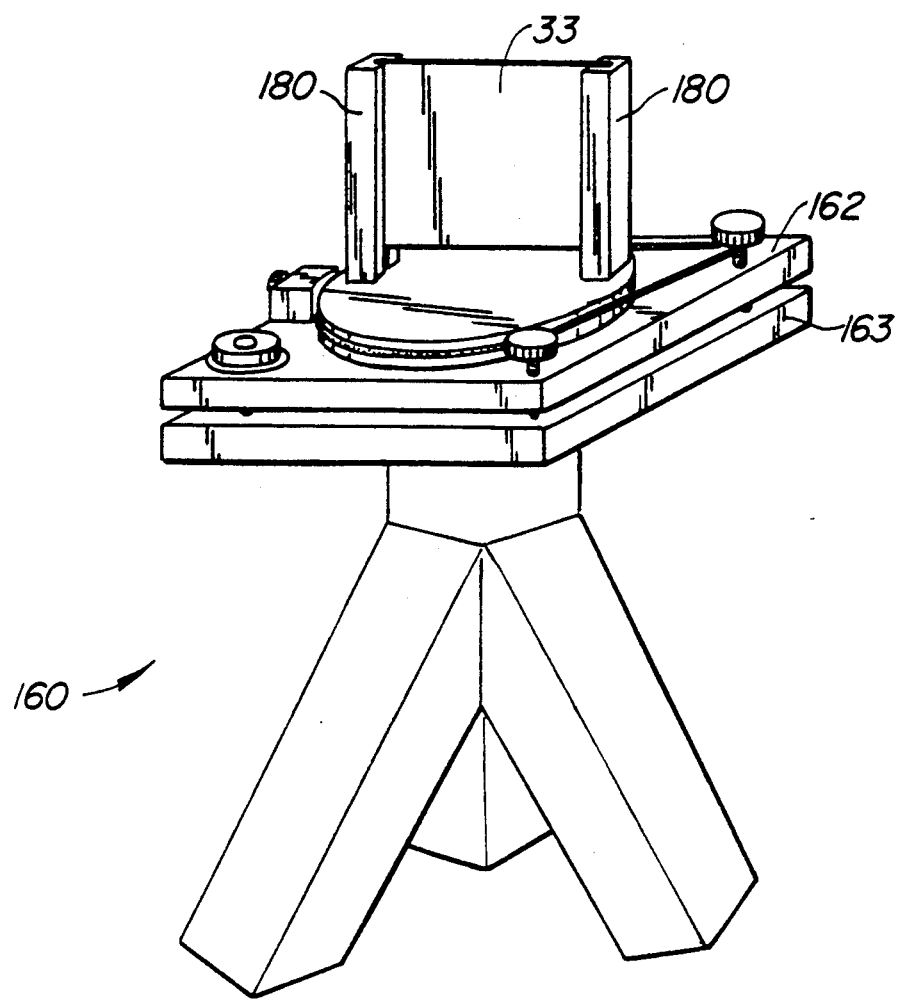
FIG._7A.
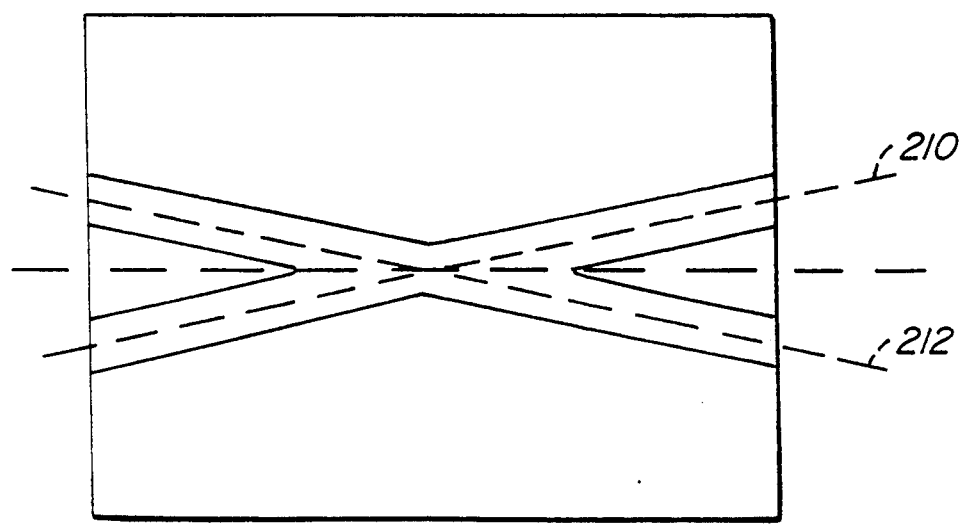
FIG._8.

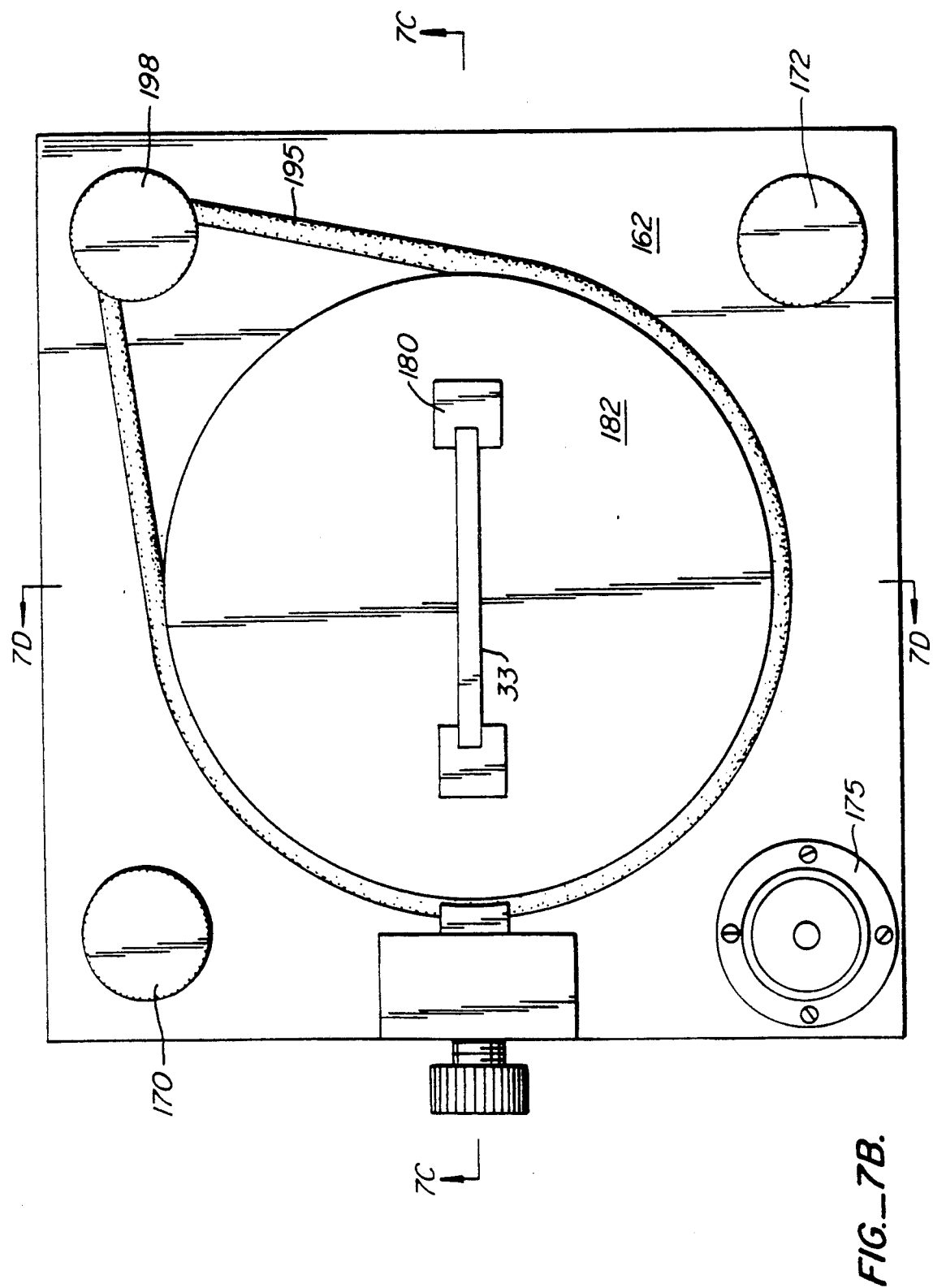
FIG._7B.

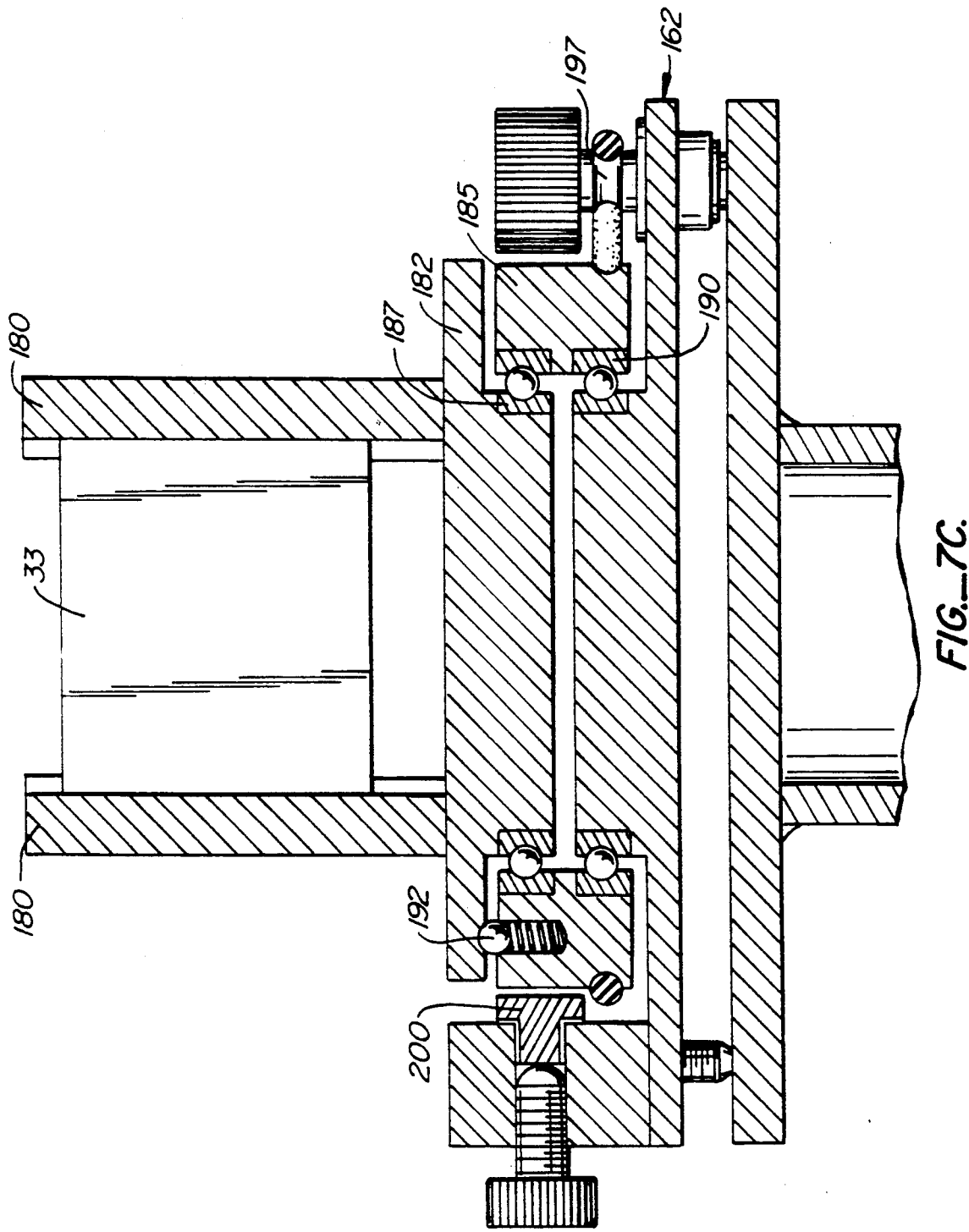
FIG._7C.

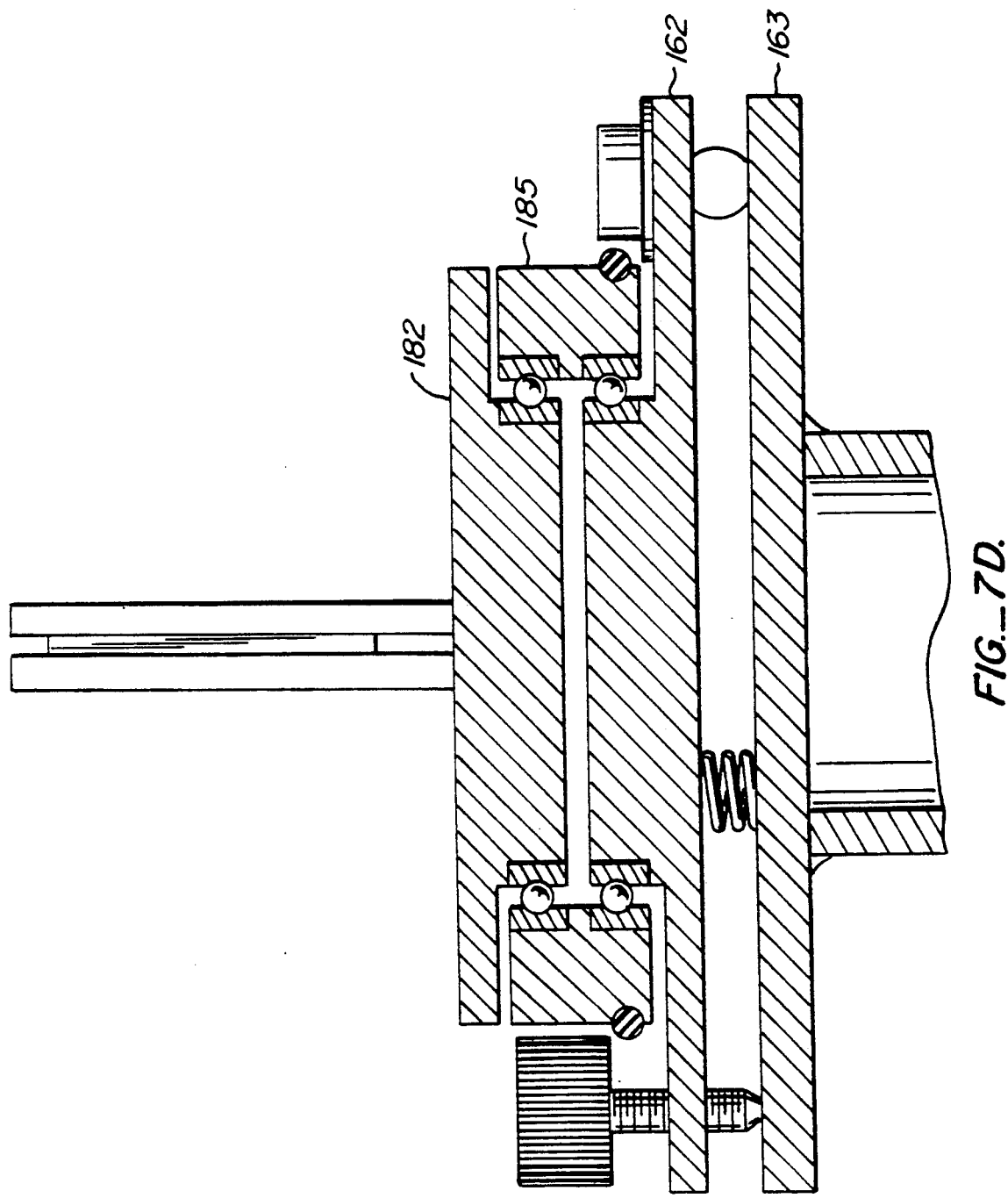
FIG._7D.

LASER-BASED WHEEL ALIGNMENT SYSTEM

BACKGROUND OF THE INVENTION

The present invention relates generally to wheel alignment systems, and more particularly to laser-based wheel alignment systems.

The axes about which the front wheels of an automobile or truck turn as it travels down the road must be carefully set to minimize tire wear and insure safe and stable handling characteristics. The orientation of these axes is determined by three angles: (1) the toe-in angle, which specifies the angle between the rim of the wheels and a line drawn parallel to the direction in which the car is pointed; (2) the camber angle, which specifies the angle between the rim of the wheels and the vertical; and (3) the caster angle, which specifies the angle between the vertical and the axis about which the individual wheels turn when changing direction. These angles are typically specified individually for each wheel and for each model and make of vehicle, and must be periodically tested and reset as the vehicle and tires age to insure continued economic and safe vehicle performance.

The measurement of these angles has represented a growing challenge to the shops and service stations responsible for alignment service. While simple side-slip gauges were successfully used in the past to check and set toe-in, the readings obtained with such gauges depend on the type of tire installed on the vehicle. In particular, side-slip gauges appear to give widely diverging and erroneous readings for radial tires.

Further, while presently available mechanical alignment machines are capable of measuring the toe-in, camber, and caster angles, the special ramps, gauges, and electronic hardware and software required for operation are beyond the means of many service stations who wish to perform this work.

SUMMARY OF THE INVENTION

The present invention provides a simplified, compact, accurate, and economical alignment system capable of measuring the toe-in, camber, and caster angles of the wheels of road-going motor vehicles. The invention uses a simple optical system, which substantially reduces both the cost of the equipment and the space required to perform wheel alignment service.

According to a broad aspect of the invention, a single, highly collimated, beam of light from a low power visible laser is split into several parts which are then directed by a sequence of plane (preferably front surface) mirrors to define a series of reference beams in a plane parallel to the surface on which the vehicle being serviced is parked. The plane mirrors include fixed mirrors for directing the beams to the front wheels and moveable mirrors for directing the beams to the rear wheels (if required).

These reference beams are set up to strike the surfaces of a set of planar retroreflectors mounted on the wheels being serviced. The orientation of the retroreflectors is set so that, when the wheels are properly aligned, the reflected laser beams will exactly retrace the paths of the initial reference beams. The reflected beams are then combined using a large aperture partially transmitting mirror and the positions of the reflected beams are observed visually on an opaque or ground glass screen.

The invention utilizes a beamsplitter (such as a multilayer dielectric or pellicle-type beamsplitter) to divide the laser beam into two generally parallel beams which are directed towards, and reflected from the wheel-mounted retroreflectors. The orientation of each of the retroreflectors is set by the service technician to cancel the vertical and horizontal angular offsets expected when the toe-in and camber angles are properly set. The beams returned from the retroreflectors are combined either in the same or a second, independent beamsplitter to produce a visual image of the configuration of the reflected beams on a viewing screen. A large aperture beam combiner is used to permit the acquisition of beams reflected from badly misaligned wheels and to permit service to be performed on vehicles which are parked skew to the centerline of the system.

The position of the reflected laser beams on the screen relative to the center of the screen and/or to each other indicates the deviation from correct alignment. Perfect alignment is obtained when the laser beams overlap on the viewing screen to form a single spot which is vertically centered on the viewing screen. While an angular offset of the vehicle will cause the merged spots to move horizontally across the screen, this motion will not cause the merged spots to separate. Thus wheel alignment can be measured even when the vehicle is not perfectly aligned with the axis of the alignment system.

The plane mirrors used to guide the incident and reflected laser beams to and from the wheel-mounted retroreflectors define a folded optical transport system for the incident and reflected laser beams which either preserves or reverses the left/right orientation of the incident and reflected beams at the viewing screen, depending on whether the number of reflecting surfaces is even or odd. The number of mirrors in the left and right branches of the system must both be either even or odd so that the beams reflected from the left and right and front and rear wheels of a vehicle can be compared on the viewing screen.

The path lengths for the beams reflected from the left and right front wheel-mounted mirrors to the viewing screen must be substantially equal so that the spots on the viewing screen remain overlapped if the axis of the vehicle is displaced in angle from the centerline of the alignment system. It is also necessary to employ one or more lenses along the optical path rear wheel-mounted mirrors to the viewing screens so that the spots created on the viewing screens by the beams reflected from front and rear wheels remain overlapped when the axis of the vehicle is displaced in angle.

The orientation of the mirrors must be set so that the incident beams from the laser and beamsplitter to the wheel-mounted mirrors each lie as nearly as possible in a single plane parallel to the surface of the floor on which the vehicle rests, and are preferably each either parallel or normal to the initial laser beam.

The use of a series of beamsplitters and mirrors to create a system of laser reference beams, the use of tiltable wheel-mounted retroreflectors to null the angular deflection of the reflected beams caused by the desired values of toe-in and camber, and the use of a beam combiner to compare the angular orientation of the beams reflected from the wheels being serviced provides a simple and accurate way to align the wheels of the vehicle being serviced, which eliminates the requirement in prior alignment systems to individually measure the alignment of each wheel. Further, this system is substantially unaffected by errors in the placement or orientation of the vehicle being serviced.

In the preferred embodiment of the invention, the same beamsplitter is used to divide and recombine the laser beams. A ground glass screen is used to directly view the reflected and combined beams, while a closed circuit TV camera is used to transmit the image of the combined beams to one or more remote locations for viewing by service and supervisorial personnel or by the customer.

The readout obtained from this simplified system is particularly straightforward, and readily adapted to use by personnel working under the car or in other inaccessible locations, or via closed circuit television at a distance from the vehicle. In addition, the readout can be readily understood by untrained personnel, including customers who wish to observe the alignment procedure or to verify the initial or final states of alignment of their vehicles. The opportunity for customers to observe the alignment process is a significant sales feature, particularly for customers with a personal interest in the condition or performance of their vehicles.

A further aspect of the invention relates to a preferred mounting for the retroreflectors to the rims of the wheels to be aligned. A device for mounting the mirror to the wheel comprises a flat reference plate having at least three pins for registering the plate to the wheel rim parallel to the wheel plane. A plurality of permanent magnet assemblies engage the wheel's studs or lug nuts to hold the reference plate in place. The retroreflector is carried by a kinematic mount rotatably mounted to the reference plate. The kinematic mount can be levelled, and its angles set so that the retroreflector is vertical and parallel to the retroreflector on the opposite wheel when the wheel angles are correctly adjusted.

A further aspect of the invention relates to the magnet assembly that engages the stud. The assembly includes a permanent magnet magnetized axially relative to the lug nut. A cylindrical shroud of high permeability material surrounds the permanent magnet and extends beyond it to surround the stud. This provides a return path for the flux and maximizes the attractive force between the magnet assembly and the stud.

A further aspect of the invention relates to a preferred mirror mount for setting the position and orientation of the plane mirrors opposite the wheels of the vehicle under test. While the orientation of the fixed mirrors is set by conventional surveying techniques, the invention provides a simple and effective way to set the moveable mirrors in the system at 45° to the nominal axis. This facilitates the set-up of the alignment system, particularly when checking the alignment or orientation of the rear wheels of a vehicle.

The mirror is mounted to a platform that rotates relative to an intermediate element such as a ring. The intermediate element itself rotates relative to a plate. The platform and intermediate element are formed with detents for establishing desired relative orientations, for example 0° and ±45°. The intermediate element can be locked at any position relative to the plate. In use, the platform is rotated to the 0° detent, and the intermediate element is rotated to set the mirror perpendicular to the beam axis. The intermediate element is locked in position, and the platform is then rotated to engage the detent at +45° or −45° as required.

A further understanding of the nature and advantages of the present invention may be realized by reference to the remaining portions of the specification and to the attached drawings.

DESCRIPTION OF THE DRAWINGS

FIG. 1 is a top schematic view of a laser-based wheel alignment system according to the present invention;

FIGS. 2A and 2B are top and side views of the laser, beamsplitter and viewing screen assembly;

FIGS. 3A and 3B are top and side views of the mirror and lens mount;

FIGS. 4A and 4B are front and side views of the device for mounting the retroreflectors to the wheels;

FIGS. 5A and 5B are exploded isometric and cross-sectional views of the kinematic mount for holding and aligning the retroreflector;

FIGS. 6A and 6B are exploded isometric and cross-sectional views of the magnet assembly for holding the retroreflector mounting device against the wheels;

FIGS. 7A, 7B, 7C, and 7D are perspective and top views and two cross-sectional views of a preferred mounting for the moveable 45° deflection mirrors; and FIG. 8 shows the paths traced by the beam spots on the screen as the steering wheel is turned.

DESCRIPTION OF SPECIFIC EMBODIMENTS

Optical System Overview

FIG. 1 is a top schematic view of a laser-based alignment system 10 for aligning the wheels of a vehicle. The system is characterized by an axis 11 along which the vehicle is placed as closely as is practical. The vehicle itself is not shown, but its left and right front wheels 12L and 12R, and its left and right rear wheels 13L and 13R are. Although not shown, access to the suspension components of the vehicle being serviced can be provided by means of a pit under the vehicle in the slab on which the vehicle is parked. To secure access to the suspension system of the vehicle, the pit should extend either partly or completely along the length of the vehicle. The design of such pits is well established in the automotive service industry, and will not be described further.

Each wheel carries a retroreflector 15 that is mounted so as to be perfectly vertical when the toe-in and camber angles are correctly set. A laser 20 produces a collimated beam of visible light which is split into two equal-intensity beams by a beamsplitter 22. One of the beams, designated 25 is reflected by the beamsplitter while the other beam, designated 27 passes through it. Beam 25 encounters plane mirrors 30 and 31 which direct it rearwardly along the left side of the vehicle. Plane mirrors 32 and 33 direct a portion of beam 25 to the left wheels of the vehicle. Similarly, a plane mirror 41 directs beam 27 along the right side of the vehicle. Plane mirrors 42 and 43 direct the laser beams to the right wheels. Mirrors 33 and 43 are optional, being required only if the rear wheels of the vehicle are to be aligned. If such is the case, mirrors 32 and 42 are partially transmitting.

A first pair of lenses 45 are disposed in the beam paths from the rear retroreflectors to account for the possibility that the vehicle is not perfectly positioned parallel to axis 11. A second pair of lenses 46 are placed in the beam paths from the front retroreflectors. These lenses are optional, and are used to increase the range of angles that can be imaged as will be described below.

As noted above, the two beams are directed along respective paths on either side of the vehicle by mirrors 31 and 41, which are oriented to direct the beams along generally parallel paths lying in a plane parallel to the surface on which the vehicle rests. All or part of the beams are then directed to the front retroreflectors by mirrors 32 and 42. Mirrors 32 and 42 are set at 45° so that the paths to the retroreflectors are parallel. If both the front and rear wheels of the vehicle need to be aligned, mirrors 32 and 42 must be partially transmitting to permit passage of a portion of the beams to pass through to mirrors 33 and 43 and to the rear wheel-mounted retroreflectors. Mirrors 33 and 43 are set at 45° so that the paths to the rear retroreflectors are parallel.

The laser beams reflected from the wheel-mounted retroreflectors then propagate along paths, shown in phantom, to beamsplitter 22 (which now acts as a beam combiner) and then to a screen 47 and an optional second screen to be described below. The laser/beamsplitter assembly is positioned between mirrors 31 and 41 to equalize the path lengths from the left and right retroreflectors to the viewing screen 47.

If the vehicle were positioned exactly parallel to axis 11 and the wheels were properly aligned, the retroreflectors would each be vertical with their planes parallel to axis 11, and the return beams would retrace the forward paths and converge to form a single spot at the center of screen 47. Alignment and positioning errors will force the return beams to follow the deviated paths shown in phantom leading to the appearance of multiple spaced spots on the screen which may be offset from the center of the screen. Accordingly, the beam-combining beamsplitter and the viewing screen must have a height and width sufficient to image the beams reflected from the retroreflectors over the anticipated range of initial alignment and vehicle positioning errors. Beam combiners as large as 6" by 12" can be fabricated using dielectric multilayer films deposited on high quality ground or cast plate glass substrates.

The laser source required for operation can operate at any wavelength in the visible region of the spectrum, so long as its power output falls within the limits for safe operation prescribed by the Bureau of Radiological Safety and OSHA. Typically, a 2 milliwatt helium-neon laser would be used as this source. Since the division ratio of the beamsplitters used to divide and recombine the beams produced by the laser and reflected from the wheels being serviced will vary depending on the polarization of these beams, to attain a fixed division ratio it is necessary to use a laser with fixed linear polarization oriented either normal to or in the plane of the beamsplitter.

The wheel-mounted retroreflectors should have the largest possible diameter consistent with the limits imposed by the mounting structure so as to maximize the range of wheel diameters which can be serviced at a given height of the laser above the slab on which the vehicle is parked. A diameter of 3 inches or more is recommended since it can be used to service vehicles with tire diameters varying over a range of 6 inches.

FIGS. 2A and 2B are top and front views of the laser/beamsplitter assembly. Also shown is the second screen 60, mentioned above but not shown in FIG. 1. Laser 20, beamsplitter 22, mirror 30, and screens 47 and 60 are mounted on a rigid plate 62. Plate 62 is in turn supported by a wall bracket 63 or the like which is bolted to a rigid masonry wall or pier. Plate 62 is levelled by means of the three kinematic adjustment screws 65. The height of the bracket and hence the laser is set by means of slotted mounting holes 67 and adjustment screws 68 insure that the laser reference beams strike the reflecting surfaces of the wheel mounted retroreflectors.

Viewing screen 47 may be made of ground glass or plastic. The combined, reflected laser beams are stopped on the ground surface of the screen, and viewed through the screen by the operator. This screen is best mounted on the side of beamsplitter 22 opposite to laser 20. Screen 60 has a non-specular surface and can be installed between the beamsplitter and the laser, provided that a small hole 70 is drilled through the screen to allow passage of the beam from the laser. This second screen must typically be inclined at an angle to allow viewing of the screen from above or from the side. A closed circuit TV camera 71 transmits the image of the beam spots on screen 60 to a remote TV monitor 72 for the use of the service technician or others.

As noted above, lenses 45 are provided to insure that the displacement of the laser beams reflected from the rear wheels of the vehicle as seen on the viewing screen(s) match the displacement of the beams reflected from the front wheels of the vehicle in the event the axis of the vehicle is not parallel to axis 11.

FIGS. 3A and 3B are top and side views showing the mounting for one of lenses 45 and its neighboring mirror (for example, mirror 42). The lens is shown in phantom since it is mounted in a ring 75. The lens and mirror are mounted to a plate 77 which may be leveled and supported in the same manner as plate 62 in the laser/beamsplitter assembly. Lenses 45 must be installed so that their optical axes are centered on the beam paths from the laser to prevent the deflection of the laser beams from the laser propagating along these paths.

Lenses 46 are optionally placed in the paths in order to increase the range of angles over which the returning beams can be imaged through beamsplitter 22 on the screens. Lenses 46 must also be carefully installed so that their optical axes are centered on the paths to prevent the deflection of the laser beams from the laser propagating along these paths.

Lenses 45 and 46 can either be conventional refractive or fresnel lenses, or holographic phase gratings fabricated to provide the required focal length at the operating wavelength of the laser source. The lenses should either be anti-reflection coated or fabricated from suitable low-index optical materials to minimize reflection losses.

Lens Parameters

The focal length of the lenses 45 is determined by the optical path length from the front retroreflectors to the viewing screens, from the rear retroreflectors to the screens, and from the rear retroreflectors to the lenses according to the equation:

$$f = L_3 \cdot (L_2 - L_3)/(L_2 - L_1)$$

where
$L_1$ = optical path length from front retroreflectors to viewing screen(s)
$L_2$ = optical path length from rear, retroreflectors to viewing screen(s),
$L_3$ = optical path length from rear retroreflector to lens 45.

It is assumed in this equation that the distance from the lenses to screens 47 and 60 is the same on the left and right hand sides of the vehicle being serviced. Although the focal length computed for lenses 45 will vary depending on the wheel base of the vehicle being serviced, it is possible for most passenger cars and light trucks to use a single lens computed on the basis of the average wheel base to be serviced. The lenses the need only be changed when servicing vehicles with exceptionally long or short wheelbases. It is, of course, not necessary to use such lenses at all if only the front wheels of the vehicle need to be aligned.

As an optional feature an additional pair of lenses 46 are placed in the optical paths between the front retroreflectors and the viewing screens to increase the effective aperture of the viewing screens. If these lenses are not used, reflected beams which deviate from the incident beams by an angle $\theta$ greater than arctan(A/L), where A is the viewing screen half width or height and L is the path length from retroreflector to viewing screen, will miss the viewing screen. If the wheels of the vehicle being serviced are grossly out of alignment, it may be impossible to image the reflected beams on the viewing screen, and hence, impossible to tell in what direction the toe-in and camber adjustments need to be moved to align the wheels being serviced.

The range of initial alignment errors which can be accommodated by the invention can be increased by adding lenses 46 between the front retroreflectors and the viewing screens. The focal length of these lenses is determined by their placement and by the magnitude of the desired increase in the angular aperture of the viewing screen. Assuming that it is desired to increase the aperture by a factor M, the focal length of lenses 59 can be computed from the equation:

$$f = (M/(M-1)) \cdot (1 - (L_4/L_1)) \cdot L_4$$

where $L_4$ = distance from front retroreflector to lens 46.

The focal length of lenses 45 must also be changed in this version of the invention to preserve the functionality of lenses 45. The focal length of lenses 45 required when lenses 46 are used can be computed from the equation:

$$f = \frac{[(L_2 - L_3) + ((M - 1)/M) \cdot (L_1/L_4) \cdot (L_1 - L_2 + L_3 - L_4)]L_3}{(L_2 - L_4) + ((M - 1)/M)(L_1/L_4)[L_1 - L_2 + L_3 - (M/(M - 1))(1 - (L_4/L_1))L_4]}$$

Wheel-Mounted Mirrors

FIGS. 4A and 4B are front and side views of a device 80 for mounting one of retroreflectors 15 to one of the wheels. Device 80 comprises a flat reference plate 81 which is registered to the rim of the wheel by three pins 82 extending perpendicular to the plate from three triangularly located mounting points. Portions of the wheel rim are shown in phantom in FIG. 4B. The plate is held against the wheel by a set of magnet assemblies 85 which engage the wheel's studs or lug nuts. The magnet assemblies are mounted on threaded rods 86 with compression springs 87 and jam nuts 88, which are set by the operator to adjust the force generated by the magnets and to compensate for the varying heights of the studs encountered on differing vehicles.

Plane retroreflector 15 is mounted in a kinematic mount 90 having a bubble level 92. Kinematic mount 90 is mounted for rotation about a spindle 95 that extends perpendicular to the plate. The vertical and horizontal axes of the mount are established by rotating the mount on spindle 95 so as to center the bubble in level 92. The kinematic mount includes leadscrews 97 and 98, each with a knurled knob, to provide for adjustment of the vertical and horizontal angles of the mirror relative to the plate. The knobs actuating the leadscrews are calibrated in degrees to permit the operator to set the vertical and horizontal angles of the mirrors to match the angles listed in the manufacturer's specifications for the camber and toe-in of each wheel.

Reference plate 81 is preferably formed with four slots, a pair of longitudinally opposed slots 100 and 102 and a pair of slots 105 and 107 disposed at ±36° from slot 102. While only three slots are required to accommodate the pins, the four slots are required to allow for the varying numbers of wheel studs encountered on differing vehicles. The configuration of slots 100, 102, 105, and 207 shown in FIG. 4A is needed to accommodate the 4-, 5-, and 6-stud wheels most commonly encountered on passenger vehicles and light trucks. In this arrangement, pins 82 should be located permanently (but slidably) in slots at 100, 105, and 107 while the magnet assemblies can be moved from slot to slot as required to accommodate the changes in the positions of the mounting studs encountered on different vehicles.

FIGS. 5A and 5B are exploded isometric and cross-sectional views of kinematic mount 80 and retroreflector 15. The basic elements of the kinematic suspension system for the mount include a back plate 120 and a front plate 122, tension springs 125, lead screws 97 and 98, and a set screw 127. As in prior kinematic mounts, the end of set screw 127 is machined to the form of a hemisphere which is seated in a hemispherical cup 128 cut into rear plate 120. Rotation of the set screw in the threads cut into front plate 122 determines the nominal separation of the assembled front and back plates. The end of one of the lead screws is also cut into the form of a hemisphere which is seated in a cylindrical groove 129 cut into the back plate. It is important that this groove be cut along a straight line which intersects the center of the cup locating the set screw, and that the two lead screws be located at 90° relative to each other and the set screw. The end of the second lead screw can be cut to form a spherical surface of arbitrary radius. The end of this lead screw slides freely along the planar front surface of the back plate. Rotation of the two lead screws in the threads cut into the front plate uniquely and stably determines the vertical and horizontal angles of the front plate relative to the front and rear surfaces of the back plate. The front and back plates are held in juxtaposition by means of the tension springs 125 whose free ends project through clearance holes cut into the front and rear plates. The ends of the springs are fixed by means of pins which pass through the ends of the springs and are set into recesses cut into the rear surface of the back plate and the front surface of the front plate.

Spindle 95, which is used to set the angular orientation of the kinematic mount is threaded into the rear surface of the mount at one end, and held at the other end against the rear surface of reference plate 81 by means of a flat washer 130 which slides without interference along the cylindrical surface of the spindle, a belville-type spring washer 132, and a jam nut 133. The length of the spindle, the thickness of the flat washer, and the spring constant of the belville washer are chosen to hold the rear surface of the back plate of the kinematic mount against the front surface of reference plate 81 while permitting the free rotation of the kinematic mount about the axis of the spindle. The sliding surfaces of reference plate 81, back plate 120, and spindle 95 must be machined to close tolerances, polished and lubricated, or otherwise treated to reduce friction and wear during operation.

Retroreflector 15 is clamped in a conformal cup machined in the front surface of front plate 122 of the suspension system by means of a clamp ring 135 and machine screws 137. In this arrangement, the angular orientation of the front surface of the mirror and the rear surface of the rear suspension plate is set by the planarity of the front and rear surfaces of the mirror and the suspension plates and by the gap between the plates as determined by set screw 127 and vertical and horizontal lead screws 97 and 98. It is straightforward to hold the planarity of the front and rear surfaces of the mirror and suspension plates to better that a minute of arc. Under these circumstances, the angular orientation of the front surface of the mirror is for practical purposes determined entirely by the gap between the front and rear suspension plates, which can be checked for purposes of calibration by means of standard gauge blocks, feeler gauges, or micrometer calipers.

The material chosen for retroreflector 15 must satisfy a number of stringent requirements including dimensional stability, high reflectivity, and resistance to abrasion and impact damage. The preferred material for this mirror is chrome carbide, a hard and stable metallic alloy which is available commercially for use in precision metrology laboratories in the form of large diameter, optically polished cylindrical blanks.

The readout of the angular position of the retroreflector in this mount is secured by observing the angular positions of the knobs for the vertical and horizontal lead screws. As shown in FIGS. 4A and 5A, the knobs are scribed to permit the visual observation of the angle through which the knobs have been turned, and hence, of the change in gap between the front and rear suspension plates. The actual calibration of the knobs is determined by the pitch of the lead screws and their linear separation, which quantities must be chosen to match the range in angles required for operation. The thread and spacing of the lead screws and the pattern for the scribe marks should be chosen to permit the angles of the mirror to be set to within ±0.05 degrees or better. The sense of rotation of the lead screws, and hence the signs of the horizontal and vertical angular displacements of the mirror, is determined by observation of the relative heights of the top surface of the knobs for the lead screws and the elevated bosses on the front of clamp ring 135. The bosses also serve to protect the knobs from impact damage.

The angular orientation of the kinematic mount about spindle 95 is measured by means of bubble level 92 which is cemented into a machined recess on the front surface of clamp ring 135. In use, the kinematic mount is rotated as a whole about the axis of spindle 95 until the bubble in this level is centered.

Wheel-Retaining Magnet Assemblies

FIGS. 6A and 6B are exploded isometric and cross-sectional views of one of magnet assemblies 85. The magnet assembly functions to produce a system in which the energy stored in the magnetic field varies rapidly with the separation of the assembly and the stud to which it is applied, thereby maximizing the attractive force between the assembly and the stud.

The magnetic field in the assembly is generated by a slug 140 of permanently magnetized material such as samarium cobalt or neodymium iron. The slug is magnetized along the symmetry axis of the magnet assembly. It is important to choose a material for this application which is characterized by a high coercive force and a large energy product. In the event that a brittle material such as samarium cobalt is chosen, the slug must be encased in a shock-resistant capsule. The capsule includes a non-magnetic cylindrical shell 142 and end caps 145 and 147. End caps 145 and 147 adjoining the north and south poles of the slug must be fabricated from low carbon steel or an equivalent highly permeable material to reduce the reluctance of the magnetic circuit and the volume in which magnetic energy can be stored in the system.

A cylindrical, low carbon steel shroud 150 in the assembly guides the field from the back of the slug to the outer surface of the lug nut which is threaded on to the stud to fasten the wheel to the stud. The magnetic energy stored in the system is then essentially limited to the space between the end of the stud and the front pole of the slug, and the volume of the slug. Neglecting saturation and the air gap between the inside of the shroud and the surface of the lug nut, the stored energy would fall to zero when the front pole of the slug contacts the end of the stud. The stored energy increases rapidly when the stud and pole are separated due to the increase in volume available for energy storage in the gap between the stud and the pole, and the growth of the H-component of the magnetic field within the slug.

Since the force between the magnet assembly and the stud is determined by the rate of change of stored energy with the distance of separation, the use of shroud 150 in the assembly substantially increases the force which can be obtained from a given volume of permanently magnetized material. This both reduces the cost of the magnetic material required for the system and makes it possible to achieve the large attachment forces required to reliably secure the reference plate, mirror, and kinematic mount to the rim of the wheel.

In addition to its role in increasing the attractive force between the magnet assembly and the stud, the shroud also serves the useful purpose of reducing the external magnetic field of the assembly, and hence the generally undesirable attractive force between the magnetic assembly and other tools or steel objects which might accidentally be present in the vicinity of the assembly.

45° Self-Indexing Mirror

FIGS. 7A, 7B, 7C, and 7D are perspective and top views and two cross-sectional views of a mirror assembly 160 for rapidly establishing the proper 45° angles for mirrors 33 and 43. The mirror assembly includes a plate 162 whose inclination can be adjusted relative to a support plate 163 mounted rigidly on top of a tripod 165. The angular orientation of adjustable plate 162 is set to match the true vertical by means of lead screws 170 and 172 and a bubble level 175. The design and assembly details of the kinematic support system whereby plate 162 may be levelled are conventional and generally follow the principles described above in connection with levelling plate 62 for the laser/beamsplitter assembly and for orienting retroreflector 15 relative to reference plate 81.

Mirror 33 is held by a pair of posts 180 which are rigidly mounted to a platform 182. Platform 182 is supported on a two-stage rotating assembly for rotation relative to plate 162. More particularly, platform 181 is mounted for rotation relative to a ring 185, which is itself mounted for rotation relative to adjustable plate 162. Relative rotation about a common axis is established by thrust bearings 187 and 190. Posts 180 are set during fabrication to ensure that the front surface of mirror 33 is parallel to the axis of rotation of thrust bearings 187 and 190. A belt drive assembly including a belt 195, a pulley 197, and a knob 198 provides for rotation of ring 185 relative to plate 162.

The angular orientation of mirror 33 in the horizontal plane is set by ring 185 and platform 182. Platform 182 is indexed relative to ring 185 by a spring loaded ball bearing 192 which may seat in any one of three conformal hemispherical cups cut into the underside of platform 182 at relative angles of 0°, +45°, and −45°. In operation, platform 182 is turned relative to ring 185 until ball bearing 192 seats in the cup at 0°, and ring 185 is turned by means of the belt drive assembly to reflect the incident laser beam back upon itself. Once that alignment is established, the ring is locked in position relative to adjustable plate 162 by means of a friction lock 200, and the platform is turned in the direction required to engage the appropriate 45° detent. In practice, machining tolerances for the indexing system can be held to well below one minute of arc, a value which is generally adequate for the purpose of the wheel alignment system.

Operating Procedure

To use this device, the vehicle being serviced must be driven onto the floor slab with the front wheels between mirrors 32 and 42 to a position at which the laser beams 29 and 30 strike retroreflectors 15L and 15R mounted on the front wheels of the vehicle. The vehicle must further be parked so that it is approximately centered between the mirrors 32 and 42, and so that the longitudinal axis of the vehicle is approximately parallel to axis 11, which is defined by the laser beams. Reasonable care should be taken to park the vehicle close to this ideal position parallel to the longitudinal axis of the alignment system. To insure that the vehicle is accurately positioned, reference marks or lines should be painted or engraved on the floor to guide the vehicle into the area in which it must be parked.

If only front wheel alignment is to be performed, the vertical and horizontal axes of the retroreflectors mounted on the front wheels are set and adjusted using leadscrews 48 and 49 as described above, and the steering wheel turned until the image of the reflected spots on the viewing screen appear near the center of the screen. The camber and toe-in angles are then adjusted for each wheel until the two reflected beams merge at the center of the screen when the steering wheel is centered.

Once the toe-in and camber angles have been set, the caster angles for each wheel can be set. FIG. 8 shows the effect of caster on the tracks generated on the viewing screens by the spots reflected from the left and right front retroreflectors when the steering wheel is turned from its counterclockwise to the clockwise limits. While the spots merge at the vertical center of the screen when the steering wheel is centered, the tracks generated by the two spots are inclined to the horizontal axis. The caster angle for each wheel is equal to the angle between the line 210 or 212 traced by the spot reflected from that wheel on the screen and the horizontal axis of the screen. Given a measurement of the caster angle, corrections to the caster can be implemented as necessary to secure compliance with the manufacturer's specifications.

In the event that the camber angles on the vehicle under test are not designed to be reset, the reflected beams must be centered vertically by moving the vertical-axis leadscrews of the wheel-mounted retroreflector kinematic mounts to secure a vertical retroreflector angle equal to the actual camber of the wheels. The positions to which the leadscrews must be set to center the reflected spots in the vertical plane then indicate the actual camber angles of the left and right wheels.

In the event that it is necessary to align both the front and rear wheels of the vehicle being serviced, the mirrors 32 and 42 must be partially transmitting, and lenses 45 should be installed as described above so as to equalize the displacements of the spots returned from the front and rear retroreflectors due to errors in the orientation of the longitudinal axis of the vehicle. Also, it will typically be necessary to manually move mirrors 33 and 43 to a position opposite the rear-mounted retroreflectors due to the variations in wheel base from vehicle to vehicle. Mirrors 33 and 43 can easily be set up for use if the mirrors are set using levelled, indexed turning mounts on heavy-duty tripods of the appropriate height as described above in connection with FIGS. 7A-D.

Given these arrangements, the rear wheels of the vehicle can be aligned using the same procedure as described above for the front wheels. In the event that the toe-in and/or camber angles of the rear wheels are not designed to be reset, the existing toe-in and/or camber angles can be measured by observing the leadscrew settings at which the beams reflected from the rear wheels are centered on the viewing screen.

In the case of vehicles with straight rear axles, the toe-in and camber angles of the rear wheels are identically zero. In this case, the beams reflected from the rear wheels should merge when the vertical and horizontal lead screws of the rear retroreflectors are set at zero. Note, however, that the merged spots may be offset in the horizontal plane from the center of the view screen due to the angular displacement of the longitudinal axis of the vehicle. Such displacement may be caused either by errors in the placement of the vehicle or by damage to the frame or rear suspension system of the vehicle. If it is desired to compensate for these effects, the alignment procedure for the front wheels can be modified to require that the beams reflected from the front wheels merge with the beams reflected from the rear wheels instead of at the horizontal center of the viewing screen.

Conclusion

Each of the basic components used in the present invention, including the low power visible laser, dielectric or pellicle-type beamsplitters, refractive and fresnel lenses or holographic phase gratings, front surface mirrors and mirror, lens, and beamsplitter mounts are either commercially available or can be fabricated according to principles which are well known to workers in optics and precision mechanisms.

As noted in the description above, the central elements of the present invention are (1) the use of a laser source, beamsplitter, and set of plane mirrors to create a system of laser reference beams incident on the wheels being serviced, (2) a set of calibrated, tiltable, wheel-mounted retroreflectors set to null the angular offsets introduced by the specified toe-in and camber angles for each wheel, and (3) a beam-combining and imaging system permitting comparison of the angular orientation of the reflected beams on a single viewing screen.

Alignment is secured in this system when the combined beams merge to form a single, vertically centered spot on the viewing screen. While errors in the placement of the vehicle on the slab will cause the merged spots to move horizontally across the viewing screen, such errors will not cause the merged spots to separate.

When assembled and used in the manner described above, this system eliminates the requirement present in prior alignment systems for the use of two or more independent gauges to measure the alignment of the individual wheels during service. In addition, the system described above permits alignment service to be performed even when the axis of the vehicle has been offset due to an error in the positioning of the vehicle.

While the above is a complete description of the preferred embodiment of the present invention, various modifications, alternative constructions, and equivalents may be used. Therefore, the above description and illustrations should not be taken as limiting the scope of the present invention which is defined by the appended claims.

What is claimed is:

1. Apparatus for use in setting desired toe-in and camber angles on at least one pair of wheels on a vehicle, comprising:
   a plane mirror associated with each wheel;
   means for adjustably mounting ear mirror to its associated wheel at a selected relative angular orientation that corresponds to the desired toe-in and camber angles for that wheel such that when the wheels are set to the desired toe-in and camber angles, the mirrors are vertical and parallel to each other and face outwardly;
   means for generating first and second beams;
   incident beam transport means for directing said beams toward respective outer surfaces of the wheels to be aligned so as to impinge on said mirrors, said beams being parallel to each other and in a reference plane when they impinge of said mirrors; and
   reflected beam transport means for directing the beams reflected from said mirrors to a common region, said reflected beam transport means operating such that the reflected beams overlap at the common region when the toe-in and camber angles are correct.

2. The apparatus of claim 1 wherein said means for generating first and second beams comprises:
   a laser for generating a single beam; and
   a beam splitter disposed in the path of said single beam to provide said first and second beams.

3. The apparatus of claim 1 wherein said incident beam transport means comprises first and second sets of plane deflection mirrors, disposed in the paths of said first and second beams, respectively.

4. The apparatus of claim 3 wherein said reflected beam transport means comprises at least some of the same deflection mirrors as are in said first and second sets of deflection mirrors.

5. The apparatus of claim 1 wherein said means for mounting comprises:
   a reference plate;
   means for registering said reference plate to the associated wheel in a plane substantially parallel to the plane of the associated wheel;
   means for holding said reference plate in said registered position; and
   a kinematic mount for mounting the associated mirror to said reference plate while allowing vertical and horizontal angular displacements therebetween.

6. The apparatus of claim 5 wherein said registering means includes at least three pins extending perpendicular to said reference plate.

7. The apparatus of claim 5 wherein said holding means comprises a plurality of permanent magnets mounted to said reference plate at locations commensurate with the wheel's studs.

8. The apparatus of claim 1, and further comprising:
   a viewing screen located at the common region.

9. The apparatus of claim 1 wherein said first and second beams are associated with opposite sides of the vehicle, the vehicle has a front wheel and a rear wheel on each side, and said incident beam transport means comprises, for each of said first and second beams;
   first and second plane deflection mirrors disposed in the path of the associated beam and oriented to direct respective first and second portions of the associated beam toward the front and rear wheels on the associated side for impingement along parallel axes.

10. The apparatus of claim 9 wherein said reflected beam transport means comprises, for each of said first and second beams:
    the same first and second deflection mirrors as are in said incident beam transport means; and
    a lens, disposed in the path of said second beam portion only, said lens being at a location and having a focal length so as to cause the beams reflected from the front and rear wheels to overlap at the common region, even if the vehicle is skewed relative to the apparatus.

11. Apparatus for use in setting desired toe-in and camber angles on at least one pair of wheels on a vehicle, comprising:
    a plane mirror associated with each wheel;
    means for adjustably mounting each mirror to its associated wheel at a selected relative angular orientation that corresponds to the desired toe-in and camber angles for that wheel such that when the wheels are set to the desired toe-in and camber angles, the mirrors are vertical and parallel to each other and face outwardly; and
    means for generating a set of laser reference beams that impinge on said mirrors, are reflected from said mirrors, and are brought to a common region, said reference beams being parallel to each other and in a reference plane when they impinge on said mirrors such that the reference beams overlap each other at the common region when the toe-in and camber angles of the wheels are correct.

* * * * *